(12) United States Patent
Clas

(10) Patent No.: US 7,271,815 B2
(45) Date of Patent: Sep. 18, 2007

(54) SYSTEM, METHOD AND PROGRAM TO GENERATE A BLINKING IMAGE

(75) Inventor: Patrick J. Clas, Binghamton, NY (US)

(73) Assignee: International Business Machines Corporation, Armonk, NY (US)

( * ) Notice: Subject to any disclaimer, the term of this patent is extended or adjusted under 35 U.S.C. 154(b) by 378 days.

(21) Appl. No.: 10/970,510

(22) Filed: Oct. 21, 2004

(65) Prior Publication Data

US 2006/0098029 A1    May 11, 2006

(51) Int. Cl.
   G09G 5/00     (2006.01)
   G09G 5/02     (2006.01)
   G06T 13/00    (2006.01)
   G06T 15/70    (2006.01)

(52) U.S. Cl. .................. 345/629; 345/473; 345/619; 345/592

(58) Field of Classification Search ................ 345/629, 345/592, 473, 47, 619, 474; 715/763, 764, 715/766–768, 835, 837–838, 501.1; 705/2
See application file for complete search history.

(56) References Cited

U.S. PATENT DOCUMENTS

| | | | | |
|---|---|---|---|---|
| 4,757,309 | A | 7/1988 | Bowater et al. | 340/703 |
| 5,646,645 | A | 7/1997 | Saegusa | 345/101 |
| 6,275,236 | B1 | 8/2001 | Delahunty | 345/435 |
| 6,295,061 | B1 * | 9/2001 | Park et al. | 715/764 |
| 6,337,699 | B1 | 1/2002 | Nielsen | 345/837 |

(Continued)

FOREIGN PATENT DOCUMENTS

JP    1248190 A    10/1989

(Continued)

*Primary Examiner*—Kee M. Tung
*Assistant Examiner*—Chante Harrison
(74) *Attorney, Agent, or Firm*—Arthur J. Samodovitz

(57) ABSTRACT

System, method and computer program for displaying an image with a blinking portion. A first virtual image layer is defined in a first file to comprise a first background region. A second virtual image layer is defined in a second file to comprise a background region in one state and a transparent region in another state. The second background region is different in appearance than the first background region. The second virtual image layer is logically located on top of the first virtual image layer. The file defines that the second virtual image layer repeatedly alternates between the one and other states. A third file defines a third virtual image layer to comprise a symbol surrounded by a transparent region. The third virtual image layer is logically located on top of the second virtual image layer. The second and third virtual image layers are approximately a same shape and size as each other, are approximately superimposed on each other, and are located over a portion or all of the first virtual image layer. The definitions of the first, second and third virtual image layers are supplied to a Web browser. The Web browser is operated such that when the second virtual image layer is in the one state, the Web browser displays the second background region on a display screen surrounding the symbol, and when the second virtual image layer is in the other state, the Web browser displays the first background region on the display screen surrounding the symbol. Consequently, the region surrounding the symbol blinks between the one background region and the other background region.

15 Claims, 3 Drawing Sheets

U.S. PATENT DOCUMENTS

| | | |
|---|---|---|
| 6,486,880 B2 | 11/2002 | Clark-Schreyer et al. ... 345/473 |
| 6,587,118 B1 * | 7/2003 | Yoneda ................. 345/629 |
| 6,661,438 B1 | 12/2003 | Shiraishi et al. .......... 345/835 |
| 6,904,408 B1 * | 6/2005 | McCarthy et al. ........... 705/2 |
| 6,981,227 B1 * | 12/2005 | Taylor .................. 345/629 |
| 7,106,275 B2 * | 9/2006 | Brunner et al. ........... 345/592 |
| 7,106,343 B1 * | 9/2006 | Hickman ................ 345/592 |

FOREIGN PATENT DOCUMENTS

| | | |
|---|---|---|
| JP | 2100098 A | 4/1990 |
| JP | 2189583 A | 7/1990 |

* cited by examiner

SYSTEM, METHOD AND PROGRAM TO GENERATE A BLINKING IMAGE

BACKGROUND OF THE INVENTION

The invention relates generally to computer system user interfaces, and more particularly to a technique to make a portion of a displayed image blink.

Hyper Text Markup Language ("HTML") web pages and other images are well known today for display on a computer screen. In some applications it is desirable to make a portion of a displayed image blink. For example, it may be beneficial to focus a user's attention on an icon which represents a problem component or an action item. In such a case, the icon can be made to blink to distinguish it from other static portions of the image and alert the user that action related to the icon is required. There are known techniques to make a portion of a displayed image blink.

In one known technique, an icon can be made to blink by using an animated GIF. In this process, a developer/person uses an existing "paint" program such as JASC Paint Shop Pro program to define two images. The "paint" program provides a library of shapes, symbols, backgrounds and other graphics to assist the user in "drawing" each state of the image. The user can select, move and modify these shapes, symbols and backgrounds as needed to form the images. The user can also use a cursor to draw freehand other shapes as needed to form the images. One image includes the actual icon surrounded by a background region. The background region can be a color or a pattern, such as solid white. The other image comprises just the same background color or pattern with no icon. The developer saves each resultant image file as a (static) GIF file.

Then, the developer invokes an animated GIF program, such as JASC Animation Shop program, to create an animated GIF file using the two (static) GIF files just created. To convert to the animated GIF file, the user identifies or inputs a list of image files to be included in the animation, as well as the length of time each one should be displayed and the order of display. The user also specifies whether the animation should repeat the display of each image in a loop or simply run once and stop. Based on the sequencing, display duration and specification whether the images should be repeated, the animation program translates these images into frames in the animation. Then, the animation program saves the resultant images as an animated GIF file.

Next, the developer defines an HTML file to define a web page. The HTML file includes the name of the animated GIF file. If there is more than one icon or other graphic in the HTML web page, then there will be separate animated or static GIF files for each of them, and the HTML will include the names of these other GIF files as well. If there is text in the web page, then the HTML will define the text directly and its location without reference to a file. When a web browser at a client computer requests the HTML file, a server sends the HTML file and associated GIF files to the Web browser. Modern Web browsers such as Microsoft Internet Explorer browser and Netscape browser have programming to interpret the foregoing HTML file which includes the text and references to the GIF files. Thus, the Web browser will fetch and display both the static and animated GIF images, and will display the different states of the animated GIF images as specified in the animated GIF file. The Web browser will also display the text as specified directly in the HTML file.

It was known to create a single image by defining multiple, superimposed virtual image layers. Each virtual image layer is defined by a separate static or animated GIF file. It was known to define some portions of the outer virtual layer(s) to be transparent to allow the image of the underlying virtual layer to show through. The existing Microsoft Internet Explorer and Netscape Web browsers have programming to interpret these virtual image layers.

U.S. Pat. No. 6,275,236 to Delahunty discloses a system and method for displaying tracked objects on a display. A blinking object may be drawn on top or underneath another object. When the blinking object is turned off ("hidden or transparent"), areas and objects underneath the blinking object are made visible. When the blinking object is turned on ("visible"), any object underneath the blinking object will be obscured while objects above the blinking object obscure the blinking object. The current location and sequentially displayed previous locations are displayed by unmasking overlay data in the corresponding pixel values.

An object of the present invention is to provide an improved technique for making a portion of a displayed image blink.

SUMMARY OF THE INVENTION

The invention resides in a system, method and computer program for displaying an image with a blinking portion. A first virtual image layer is defined in a first file to comprise a first background region. A second virtual image layer is defined in a second file to comprise a background region in one state and a transparent region in another state. The second background region is different in appearance than the first background region. The second virtual image layer is logically located on top of the first virtual image layer. The file defines that the second virtual image layer repeatedly alternates between the one and other states. A third file defines a third virtual image layer to comprise a symbol surrounded by a transparent region. The third virtual image layer is logically located on top of the second virtual image layer. The second and third virtual image layers are approximately a same shape and size as each other, are approximately superimposed on each other, and are located over a portion or all of the first virtual image layer.

In accordance with features of the present invention, the first, second and third virtual image layers are all approximately a same shape and size as each other, and are approximately superimposed on each other. The definitions of the first, second and third virtual image layers are supplied to a Web browser that can render overall images that logically combine the first, second and third virtual image layers based on the definitions of the first, second and third virtual image layers. The Web browser is operated such that when the second virtual image layer is in the one state, the Web browser displays the second background region on a display screen surrounding the symbol, and when the second virtual image layer is in the other state, the Web browser displays the first background region on the display screen surrounding the symbol. Consequently, the region surrounding the symbol blinks between the one background region and the other background region.

DETAILED DESCRIPTION OF THE PREFERRED EMBODIMENTS

Figure 1:
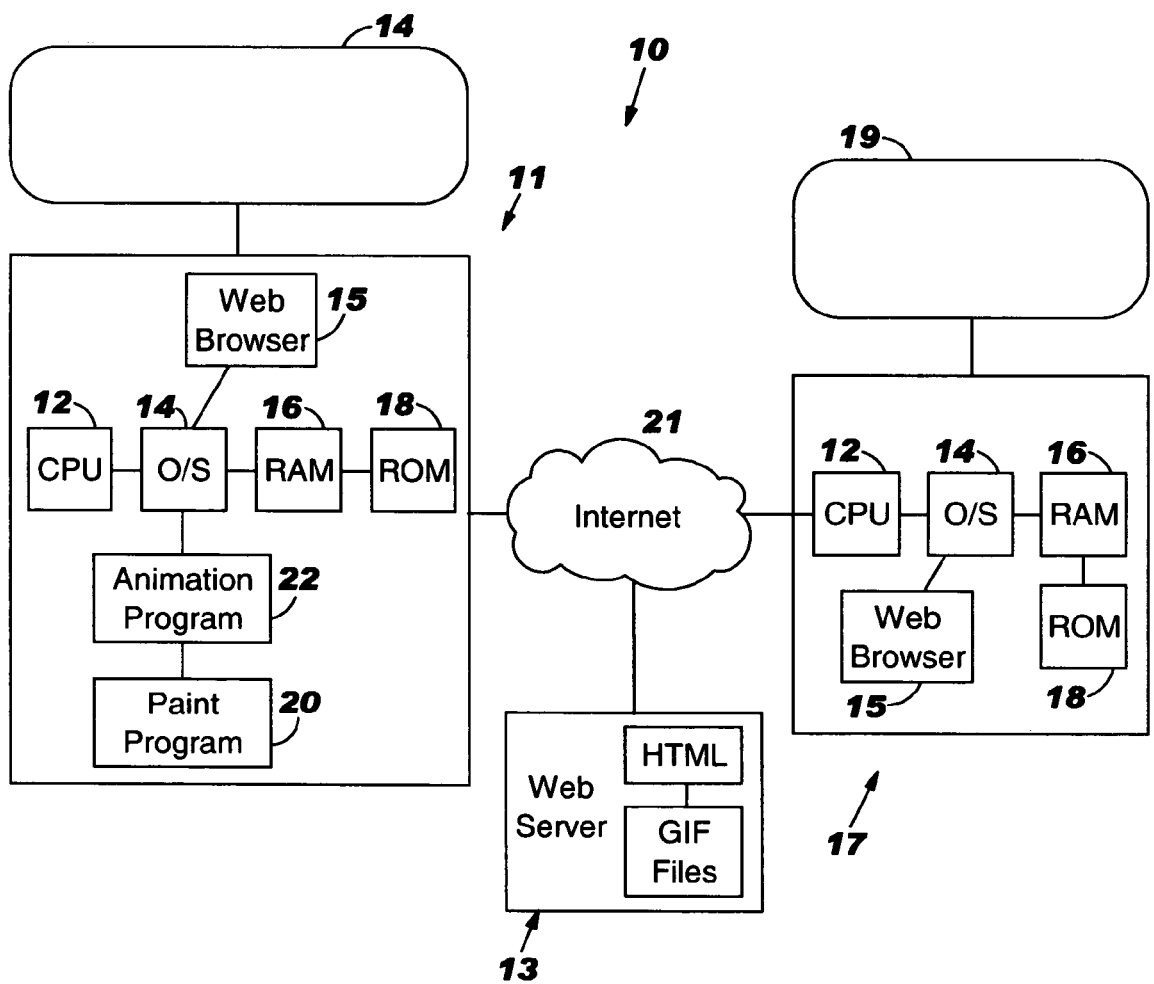
FIG. 1 is a block diagram of a distributed computer system in which the present invention is implemented.

The present invention will now be described in detail with reference to the figures, wherein like reference numbers indicate like elements. FIG. 1 illustrates a distributed computer system generally designated 10 in which the present invention is implemented. Distributed computer system 10 comprises a web-page developer's computer 1, a server 13, and a web-page user's computer 17 interconnected by one or more networks 21 such as the Internet. Developer's computer 11 comprises a known CPU 12, operating system 14, RAM 16, ROM 18, and display screen 19. Computer 11 also includes a known "paint" program 20 to generate images and corresponding GIF files, and a known "animation" program 22 to generate an animated GIF file from selected GIF files generated by paint program 20. By way of example, the known paint program 20 may be JASC Paint Shop Pro (™ of JASC Inc.) program, or other paint program such as Adobe PhotoShop (™ of Adobe Systems Inc.) program or Corel Draw (™ of Corel Corporation) program, and the known animation program 22 may be JASC Animation Shop (™ of JASC Software Inc.) program or Adobe Premier (™ of Adobe Systems Inc.) program.

Figure 2:
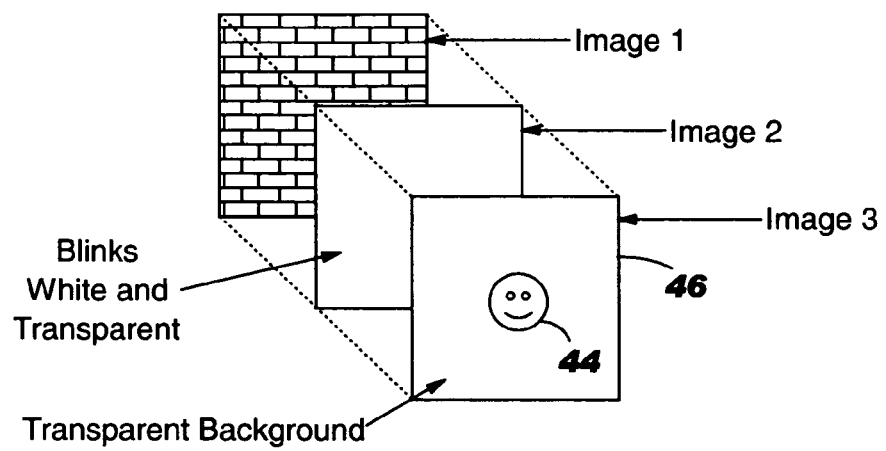
FIG. 2 figuratively illustrates three virtual image layers used to implement the present invention.

FIG. 2 figuratively and graphically illustrates three virtual image layers 1, 2 and 3 that a developer (person) defines using the known paint program 20. The paint program 20, such as JASC Paint Shop Pro program, provides a library of shapes, symbols, backgrounds and other graphics to assist the developer in "drawing" the virtual image layers. The paint program also provides tools such as a virtual paintbrush or a virtual pencil to assist in creating a new image or modifying an existing image. These tools are all simulated using the mouse cursor to represent the tool, i.e. if the user is using the pencil tool, then the user clicks and drags the mouse to simulate drawing with a pencil where the location and movement of the cursor represents a line or shape drawn by the pencil. When a developer saves the image as a GIF file, the paint program converts the image to a file containing data bytes that represent or map to the image. These bytes conform to the standard GIF89A specification (Ref.-http://www.w3.org/Graphics/GIF/spec-gif89a.txt).

These image layers 1, 2 and 3 are "virtual" because display screens 19 (of the developer and the user) only have one real layer of imaging. The web browsers 15 (of the developer and the user) logically combine the three virtual images to determine and display on screen 19 what will be apparent logically at the outer surface of virtual image layer 3. The developer defines and uses three virtual images instead of one consolidated image layer because it is easier to define the desired blinking image using the three virtual layers, as described below. In the illustrated example, these virtual image layers comprise part or the entirety of an HTML web page, although they could comprise part or the entirety of other documents or diagrams as well. The following describes the three virtual Image layers 1, 2 and 3 in more detail.

Virtual Image 3 layer comprises a symbol or icon 44 and a transparent background region 46, such as enclosed by the sides of a rectangular. The specific design of the symbol or icon 44 is not important to the present invention, and could be a simple action button or a shape of a component being represented. In this embodiment of the present invention, Image 3 layer is static; the symbol or icon 44 itself is constant and does not blink or vary, and the transparent background region 46 stays transparent and does not blink or vary. As described in more detail below, the virtual Image 2 layer and the virtual Image 1 layer alternately appear through the transparent background region 46 surrounding symbol or icon 44 to make the background region 46 appear to blink to the user.

The virtual Image 2 layer has two states. One state is a background color or pattern such as solid white, and the other state is a transparent state. The specific background color or pattern of the virtual Image 2 layer should be the same as the background color or pattern of the surrounding document or web page (visible to the end user) in order to create the desired effect. (The specific background color or pattern of the virtual Image 2 layer should contrast with the background color or pattern of the virtual Image 1 layer.) In the illustrated example, the surrounding background of the document or web page is solid white, so the Image 2 layer background or color should be solid white as well. In the illustrated embodiment, the perimeter of the transparent background region 46 of virtual Image 1 layer is the same as the perimeter of the virtual Image 2 layer.

After defining the two states of virtual Image 2 layer, the developer invokes the animation program 22 such as the JASC Animation Shop program, identifies the two GIF files for the virtual Image 2 layer as being two states of the same image layer, specifies the duration that each state should be displayed, and specifies whether the alternation between the two states should be continuous or should end after a certain number of alternations. In response, the animation program 22 converts the two virtual Image 2 static GIF files to one virtual Image 2 animated GIF. Then, the animation program saves the resultant images as an animated GIF file.

The virtual Image 1 layer comprises a background color or pattern which is different than that of the Image 2 background color or pattern state, and provides the contrasting color or pattern for the blinking. In the illustrated example, the background color or pattern of the Image 1 layer resembles a bricked wall, although this is just an example. In this embodiment of the present invention, virtual Image 1 layer is static; the background color or pattern of the virtual Image 1 layer does not blink or vary. In the illustrated embodiment, the perimeter of the transparent background region 46 of virtual Image 1 layer is the same as the perimeter of the virtual Image 2 layer and the same as the perimeter of the virtual Image 1 layer.

Next, the developer defines an HTML web page which references the three GIF files (called image1.gif, image2.gif and image3.gif) for the three respective virtual Image layers 1, 2 and 3. In the illustrated example, the HTML for the web page is as follows:

```
<html>
<head>
<title>Background Blinking Technique Demonstration</title>
</head>
<body bgcolor="white">
<img src="image1.gif" style="position:absolute; left:0; top:0; z-index:1">
<img src="image2.gif" style="position:absolute; left:0; top:0; z-index:2">
<img src="image3.gif" style="position:absolute; left:0; top:0; z-index:3">
</body>
</html>
```

Thus, the HTML identifies the GIF file for each virtual Image 1, 2 and 3 and its location. In the illustrated embodiment, all the locations specified in the HTML for the three virtual Image layers 1, 2 and 3 are coincident with each other, i.e. all three virtual images are superimposed on one another. In the illustrated embodiment, all of the virtual Images 1, 2 and 3 are the same size and shape as each other, although the virtual image layers 1, 2 and 3 could be of different sizes. For example, the virtual Image 3 layer could be the same size and shape as the virtual Image 2 layer (and superimposed on the virtual Image 2 layer), and the virtual Image 1 layer can be much larger than the virtual Image 1 layer and virtual Image 2 layer (where the virtual Image 3 layer and virtual Image 2 layer are located over a portion of the virtual Image 1 layer).

After the HTML for the web page is defined, the developer sends it to server 13 where it will be available to clients by supplying the respective URL or other identifier. In such a case, the server will furnish the HTML and associated GIF files to client computer 17 via the Internet 21 (or other network) upon request by the client computer 17. In response to the HTML for the web page, web browser 15 on client computer 21 processes the HTML. From the HTML, the web browser 15 determines that the three virtual images are "stacked" on top of each other because the x and y coordinates (left, top) are the same, for example, "zero" for all three images. The only difference in position is the z coordinate which determines the stacking order. The z coordinate corresponds to the order shown where the higher the z-Index, the closer the virtual image layer to the surface of the screen. In the above code, Image 3 layer is "above" Image 2 layer, and Image 2 layer is "above" Image 1 layer. When processing the HTML, web browser 15 fetches each of the referenced GIF files for virtual Images 1, 2 and 3. Each of the GIF files for virtual Images 1, 2 and 3 defines the graphical composition/appearance of the virtual Image layer as described above. The animated GIF file for virtual Image 2 layer defines two separate virtual images. The animated GIF file for virtual Image 2 layer also includes information indicating the duration that each of the image states should be displayed before alternating to the other image state. Typically, in a blinking mode, each state is displayed for equal durations, such as a duration between 0.2 and 0.5 seconds each, and the blinking is continuous (until the icon is selected). As explained above, virtual Image 2 layer blinks (or varies) between one background color or pattern such as solid white (as illustrated) and a transparent state. When the Image 2 layer exhibits its own background color or pattern state, its own background color or pattern obscures the background color or pattern of virtual Image 1 layer and shows through the transparent background region 46 surrounding the symbol or icon 44 in the Image 3 layer. Thus, the background color or pattern of the virtual Image 2 layer is visible on the display screen 19 in this one state of the virtual Image 2 layer. When Image 2 layer exhibits its transparent state, the background color or pattern of the Image 1 layer shows through the transparent Image 2 layer and the transparent background region 46 surrounding the symbol or icon 44. Thus, the background color or pattern of the virtual Image 1 layer is visible on the display screen in this other state of the virtual Image 2 layer. Thus, the alternation of states of the Image 2 layer causes the apparent blinking or variation of the background region 46 for the symbol or icon 44.

Figure 3:
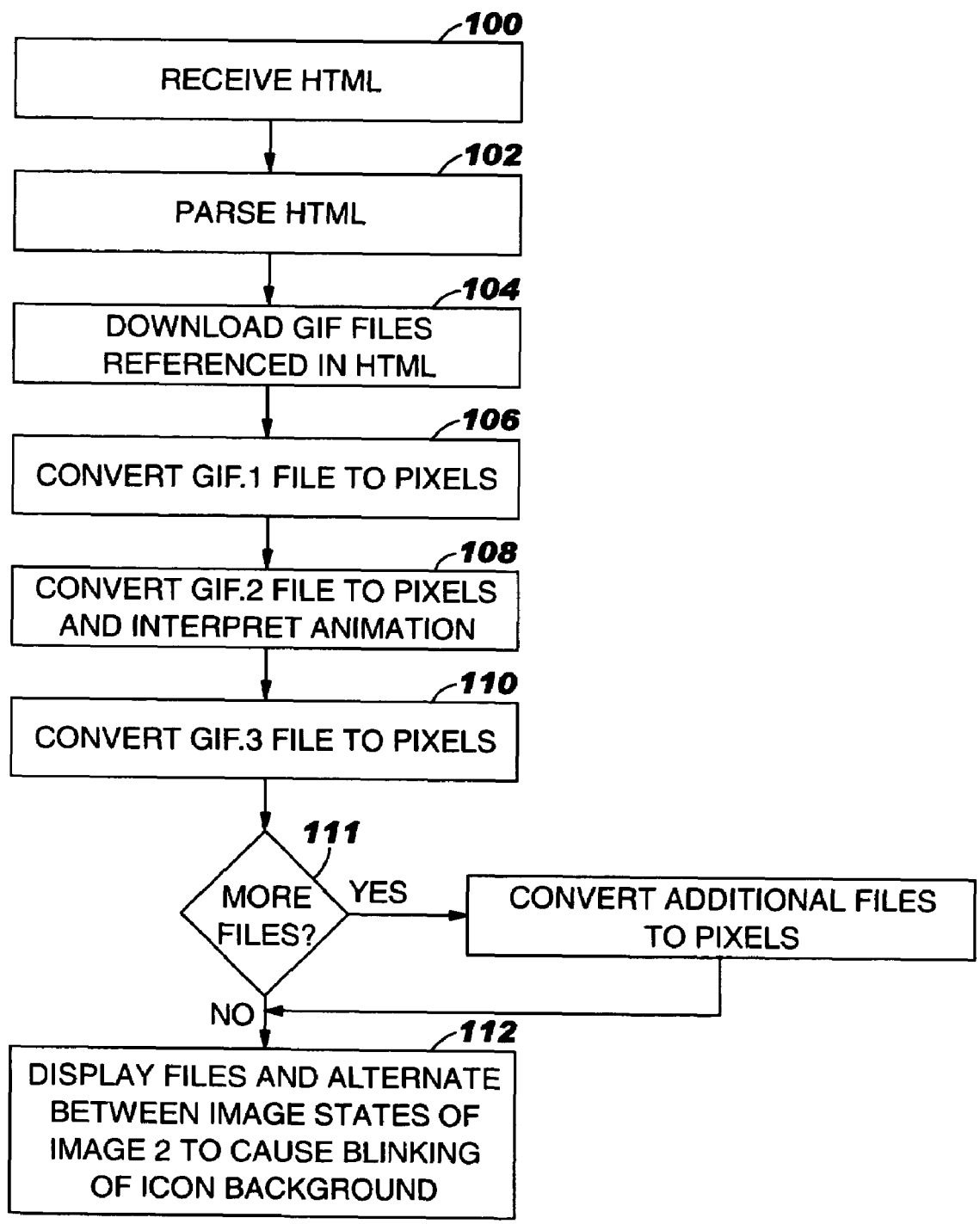
FIG. 3 is a flow chart that illustrates a procedure performed by a Web browser to interpret an HTML which references the three virtual image layers of FIG. 2.

FIG. 3 illustrates the steps performed by the Web browser 15 in client computer 17 to logically interpret the virtual Image layers 1, 2 and 3, including the alternation of states of virtual Image layer 2, and display the resultant, overall image. The Web browser 15 receives the HTML with the reference to the three Image source files, i.e. Image1.gif, Image2.gif and Image3.gif (step 100). The Web browser then parses the HTML code and identifies the three references or commands for the three Image source files (step 102). Then, the Web browser downloads the three Image source files (step 104). Each image source command directs the Web browser to convert the specified file to pixel format that can be displayed on the display screen 19. First, the Web browser 15 converts the Image1.gif source file to pixel format using the known GIF39A format referenced above (step 106). Then, the Web browser converts the Image2.gif source file to pixel format using the known GIF39A format (step 108). When the Web browser interprets the Image2.gif source file, the Web browser also generates an animation loop. The Web browser will display the first image in the file for the respective length of time specified in Image2.gif and then will display the second image in the file for the respective length of time specified in Image2.gif. There is also a flag in the file that instructs the Web browser to repeat this until the user terminates or replaces the web page. Then, the Web browser 15 converts the Image3.gif source file to pixel format using the known GIF39A format (step 110). Once all the images are converted (decision 111, no branch), the Web browser presents them on the display screen 19 at location x,y,z (step 112). The x and y coordinates are the same so that all three images are superimposed on each other, and the z coordinate is used to stack the images as shown in FIG. 2.

Figures 4A, 4B, 4C, 4D:
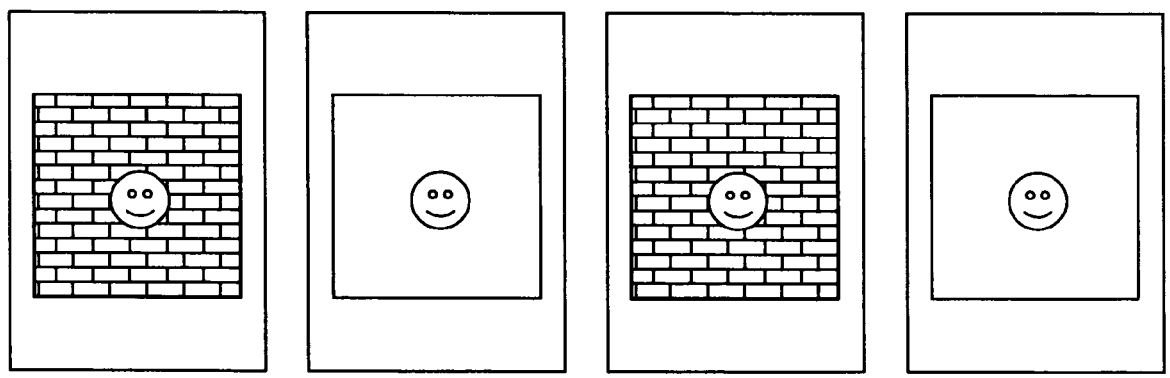
FIGS. 4(A), 4(B), 4(C) and 4(D) illustrate four sequential states of a portion of a displayed image which is blinking according to the present invention.

FIG. 4(A) illustrates one overall image which is visible on display screen 19. (The "overall" image is the logical combination of the three virtual Image layers.) To form this overall image, the Image 2 layer is transparent, so the background color or pattern of the virtual Image 1 layer is visible (through the transparent Image 2 layer and the transparent background region 46 of the virtual Image 3 layer) on display screen 19. FIG. 4(B) illustrates the subsequent overall image which is visible on display screen 19 after the overall image of FIG. 4(A). In this subsequent overall image, the virtual Image 2 layer exhibits is own background color or pattern, which in the illustrated example is solid white. So, the solid white background color of the virtual Image 2 layer obscures the background color or pattern of the virtual Image 1 layer and is visible (through the transparent background region 46 of the virtual Image 3 layer) on display screen 19. FIG. 4(C) illustrates the subsequent overall image which is the same overall image as in FIG. 4(A) and is visible on display screen 19 after the overall image of FIG. 4(B). The overall image of FIG. 4(C) is formed in the same manner as the overall image of FIG. 4(A), i.e. the virtual Image 2 layer is in its transparent state. FIG. 3(D) illustrates the subsequent overall image which is the same overall image as in FIG. 4(B) and is visible on display screen 19 after the overall image of FIG. 4(C). The overall image of FIG. 3(D) is formed in the same manner as the overall image of FIG. 4(B), i.e. the virtual Image 2 layer exhibits its own solid white background color. The sequencing of states of the virtual Image 2 layer as illustrated in the sequence of FIGS. 4(A), 4(B), 4(C) and 4(D) provides the blinking of the background region 46 surrounding the symbol or icon 44. This blinking draws attention to the symbol or icon 44, even though the symbol or icon 44 itself does not blink or vary.

Based on the foregoing, a system, method and program have been disclosed for causing a region surrounding an icon or other symbol to blink. However, numerous modifications and substitutions can be made without deviating from the scope of the present invention. For example, the background color or pattern state of the virtual Image 2 layer can be different than the surrounding background of the web page or other document. As another example, the background region of the virtual Image 2 layer could be divided into two halves or four quadrants, each with two, independently controllable states—transparent or solid white (or other background color of the overall image). In such a case, each half or quadrant could be made to blink by specification that that half or quadrant should alternate between the background color state and the transparent state. If blinking is not desired for a half or quadrant, then the state of that half or quadrant is fixed at the solid white state. Blinking of each half or quadrant represents a different, respective condition. For example, blinking of one half could indicate that a processor is turned off whereas blinking of the other half could indicate that the processor has not been IML'd. Therefore, the present invention has been disclosed by way of illustration and not limitation, and reference should be made to the following claims to determine the scope of the present invention.

The invention claimed is:

1. A method for generating and displaying a dynamic image on a display screen, said method comprising the steps of:

superimposing a first virtual image layer approximately on a second virtual image layer, and superimposing said second virtual image layer approximately on a third virtual image layer, said third virtual image layer comprising a first background region, said second virtual image layer comprising a second background region in one state and a transparent region in another state, said second background region being different in appearance than said first background region, said first virtual image layer comprising a symbol surrounded by a transparent region, said second and first virtual image layers being approximately a same shape and size as each other, and being superimposed over a portion or all of said third virtual image layer; and repeatedly alternating said second virtual image layer between said one state and said other state such that a region surrounding said symbol blinks between said first background region and said second background region.

2. A method as set forth in claim 1 wherein:

said first, second and third virtual image layers are all approximately a same shape and size as each other, and are all approximately superimposed on each other.

3. A method as set forth in claim 1 wherein a Web browser performs the superimposing and alternating steps.

4. A method as set forth in claim 1 wherein:

in response to said second virtual image layer being in said one state, a Web browser displaying said second background region on said display screen surrounding said symbol, and in response to said second virtual image layer being in said other state, said Web browser displaying said first background region on said display screen surrounding said symbol.

5. A method as set forth in claim 1 wherein:

said first virtual image layer is defined as a first GIF file; said second virtual image layer is defined as a second GIF file; and said third virtual image layer is defined as a third GIF file.

6. A system for generating and displaying a dynamic image on a display screen, said system comprising:

means for superimposing a first virtual image layer approximately on a second virtual image layer, and superimposing said second virtual image layer approximately on a third virtual image layer, said third virtual image layer comprising a first background region, said second virtual image layer comprising a second background region in one state and a transparent region in another state, said second background region being different in appearance than said first background region, said first virtual image layer comprising a symbol surrounded by a transparent region, said second and first virtual image layers being approximately a same shape and size as each other, and being superimposed over a portion or all of said third virtual image layer; and means for repeatedly alternating said second virtual image layer between said one state and said other state such that a region surrounding said symbol blinks between said first background region and said second background region.

7. A system as set forth in claim 6 wherein:

said first, second and third virtual image layers are all approximately a same shape and size as each other, and are all approximately superimposed on each other.

8. A system as set forth in claim 6 wherein said means for superimposing and said means for repeatedly alternating comprise a web browser.

9. A system as set forth in claim 6 wherein:

said means for superimposing and said means for repeatedly alternating comprise a web browser, responsive to said second virtual image layer being in said one state, for displaying said second background region on said display screen surrounding said symbol, and responsive to said second virtual image layer being in said other state, for displaying said first background region on said display screen surrounding said symbol.

10. A system as set forth in claim 6 wherein:

said first virtual image layer is defined as a first GIF file;

said second virtual image layer is defined as a second GIF file; and said third virtual image layer is defined as a third GIF file.

11. A computer program product for generating and displaying a dynamic image on a display screen, said computer program product comprising:

a computer readable media;

first program instructions to superimpose a first virtual image layer approximately on a second virtual image layer, and superimpose said second virtual image layer approximately on a third virtual image layer, said third virtual image layer comprising a first background region, said second virtual image layer comprising a second background region in one state and a transparent region in another state, said second background region being different in appearance than said first background region, said first virtual image layer comprising a symbol surrounded by a transparent region, said second and first virtual image layers being approximately a same shape and size as each other, and being superimposed over a portion or all of said third virtual image layer; and second program instructions to repeatedly alternate said second virtual image layer between said one state and said other state such that a region surrounding said symbol blinks between said first background region and said second background region; and said first and second program instructions are recorded on said media.

12. A computer program product as set forth in claim 11 wherein:
said first, second and third virtual image layers are all approximately a same shape and size as each other, and are all approximately superimposed on each other.

13. A computer program product as set forth in claim 11 wherein said first program instructions and said second program instructions comprise a Web browser.

14. A computer program product as set forth in claim 11 wherein:
said first program instructions and said second program instructions comprise a web browser, responsive to said second virtual image layer being in said one state, to display said second background region on said display screen surrounding said symbol, and responsive to said second virtual image layer being in said other state, to display said first background region on said display screen surrounding said symbol.

15. A computer program product as set forth in claim 11 wherein:
said first virtual image layer is defined as a first GIF file;
said second virtual image layer is defined as a second GIF file; and
said third virtual image layer is defined as a third GIF file.

* * * * *